(12) United States Patent
Teague et al.

(10) Patent No.: US 8,432,803 B2
(45) Date of Patent: Apr. 30, 2013

(54) METHOD OF PROVIDING A GAP INDICATION DURING A STICKY ASSIGNMENT

(75) Inventors: Edward Harrison Teague, San Diego, CA (US); Aamod Khandekar, San Diego, CA (US); Dhananjay Ashok Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1066 days.

(21) Appl. No.: 11/333,835

(22) Filed: Jan. 17, 2006

(65) Prior Publication Data

US 2006/0164993 A1    Jul. 27, 2006

Related U.S. Application Data

(63) Continuation-in-part of application No. 11/022,144, filed on Dec. 22, 2004.

(60) Provisional application No. 60/590,112, filed on Jul. 21, 2004.

(51) Int. Cl.
*G01R 31/08* (2006.01)
*G06F 11/00* (2006.01)
*G08C 15/00* (2006.01)

(52) U.S. Cl.
USPC ........................................................ 370/235

(58) Field of Classification Search .......... 370/310–350, 370/431, 441, 450; 455/436, 450, 452, 458.1, 455/507–509, 516–520
See application file for complete search history.

(56) References Cited

U.S. PATENT DOCUMENTS

| 4,574,374 | A | * | 3/1986 | Scordo ........................... 370/265 |
| 5,299,199 | A | * | 3/1994 | Wilson et al. .................. 370/347 |
| 5,615,213 | A | * | 3/1997 | Griefer .......................... 370/412 |
| 5,625,877 | A | * | 4/1997 | Dunn et al. .................... 455/454 |
| 5,768,531 | A |   | 6/1998 | Lin |
| 5,983,099 | A | * | 11/1999 | Yao et al. .................... 455/426.1 |
| 6,650,629 | B1 | * | 11/2003 | Takahashi et al. ............. 370/335 |

(Continued)

FOREIGN PATENT DOCUMENTS

| CL | 029792000 | 10/2001 |
| CL | 034692000 | 11/2001 |

(Continued)

OTHER PUBLICATIONS

International Search Report—PCT/US2005/025168, International Search Authority—European Patent Office—Nov. 24, 2005.

(Continued)

*Primary Examiner* — Mark Rinehart
*Assistant Examiner* — Maharishi Khirodhar
(74) *Attorney, Agent, or Firm* — Nerrie M. Zohn

(57) ABSTRACT

A method and apparatus are provided to manage the assignment transmission resource of forward and reserve link that is assigned to transmitting entity for a period of time. An indication of a gap is provided whenever the transmitting entity is not transmitting actual data packets (e.g. whole or part of intended data or content), yet the transmitting entity is to maintain the assignment of the allocated resource. For example, an erasure signature packet comprising a first data pattern is transmitted on the assigned resource when there is no actual data to transmit on the assigned resource.

14 Claims, 5 Drawing Sheets

U.S. PATENT DOCUMENTS

| | | | |
|---|---|---|---|
| 6,928,062 | B2 | 8/2005 | Krishnan et al. |
| 7,042,857 | B2 | 5/2006 | Krishnan et al. |
| 7,177,297 | B2 | 2/2007 | Agrawal et al. |
| 7,180,879 | B2* | 2/2007 | Sinnarajah et al. ............ 370/335 |
| 7,181,666 | B2 | 2/2007 | Grob et al. |
| 7,197,692 | B2 | 3/2007 | Sutivong et al. |
| 7,218,633 | B2 | 5/2007 | Donaghey |
| 7,221,680 | B2 | 5/2007 | Vijayan et al. |
| 7,395,309 | B1* | 7/2008 | Lewis et al. .................... 709/200 |
| 7,536,626 | B2 | 5/2009 | Sutivong et al. |
| 8,102,832 | B2 | 1/2012 | Agrawal et al. |
| 2001/0031634 | A1* | 10/2001 | Mizutani et al. .............. 455/425 |
| 2002/0004389 | A1 | 1/2002 | Yi et al. |
| 2002/0042827 | A1* | 4/2002 | Grobler et al. ................ 709/227 |
| 2002/0119773 | A1* | 8/2002 | Niemela ........................ 455/423 |
| 2003/0033417 | A1* | 2/2003 | Zou et al. ....................... 709/230 |
| 2003/0072267 | A1* | 4/2003 | Lohtia et al. ................... 370/252 |
| 2003/0076799 | A1* | 4/2003 | Kwak et al. .................... 370/335 |
| 2003/0128676 | A1 | 7/2003 | Lee |
| 2003/0134655 | A1 | 7/2003 | Chen et al. |
| 2003/0174662 | A1 | 9/2003 | Malkamaki |
| 2004/0033821 | A1* | 2/2004 | Slesak et al. ............... 455/575.1 |
| 2004/0042508 | A1 | 3/2004 | Menzel |
| 2004/0120253 | A1* | 6/2004 | Forssell et al. ................ 370/230 |
| 2004/0153565 | A1* | 8/2004 | Bloch et al. ................... 709/232 |
| 2005/0096061 | A1 | 5/2005 | Ji et al. |
| 2006/0018258 | A1 | 1/2006 | Teague et al. |
| 2006/0018393 | A1 | 1/2006 | Gore et al. |
| 2006/0019694 | A1 | 1/2006 | Sutivong et al. |
| 2006/0034173 | A1 | 2/2006 | Teague et al. |
| 2006/0279435 | A1 | 12/2006 | Krishnan et al. |
| 2007/0150799 | A1 | 6/2007 | Sutivong et al. |
| 2008/0214121 | A1 | 9/2008 | Sutivong et al. |
| 2009/0023466 | A1 | 1/2009 | Sutivong et al. |
| 2011/0282999 | A1 | 11/2011 | Teague et al. |
| 2011/0296279 | A1 | 12/2011 | Sutivong et al. |

FOREIGN PATENT DOCUMENTS

| | | |
|---|---|---|
| CL | 001802001 | 12/2001 |
| EP | 0903906 | 3/1999 |
| JP | 62226741 | 10/1987 |
| JP | 200210341 | 1/2002 |
| JP | 2004153623 | 5/2004 |
| WO | WO0103463 A1 | 1/2001 |
| WO | 02080464 | 10/2002 |
| WO | WO03105510 | 12/2003 |

OTHER PUBLICATIONS

Written Opinion—PCT/US2005/025168, International Search Authority—European Patent Office—Nov. 24, 2005.

International Preliminary Report on Patenability—PCT/US2005/025168, International Search Authority—The International Bureau of WIPO—Geneva, Switzerland—Jan. 23, 2007.

European Search Report—EP10176890, Search Authority—Munich Patent Office, Oct. 19, 2010.

Translation of Office Action in Japanese application 2010-248685 corresponding to U.S. Appl. No. 11/022,144, citing JP62226741, JP200210341 and JP2004153623 dated Jan 25, 2011.

Translation of Office Action in Japanese application 2010-248686 corresponding to U.S. Appl. No. 11/022,144, citing JP62226741, JP200210341 and JP2004153623 dated Jan. 25, 2011.

* cited by examiner

METHOD OF PROVIDING A GAP INDICATION DURING A STICKY ASSIGNMENT

CLAIM OF PRIORITY UNDER 35 U.S.C. §120

The present Application for Patent is a Continuation-in-Part of patent application Ser. No. 11/022,144 entitled "A Method of Providing a Gap Indication During a Sticky Assignment" filed Dec. 22, 2004 which claims the benefit of Provisional Application No. 60/590,112 entitled "Erasure Signature for Sticky Assignments" filed Jul. 21, 2004. The aforementioned applications are assigned to the assignee hereof and hereby expressly incorporated by reference herein.

REFERENCE TO CO-PENDING APPLICATIONS FOR PATENT

The present Application for Patent is related to the following U.S. Patent Applications:

"MOBILE WIRELESS ACCESS SYSTEM" having Ser. No. 60/731,013, filed Oct. 27, 2005, assigned to the assignee hereof, and expressly incorporated by reference herein; and "METHOD AND APPARATUS FOR USING EXPLICIT NACKS ON FL IN AN ACK BASED SYSTEM USING HARQ" having Ser. No. 60/691,457, filed Jun. 16, 2005, assigned to the assignee hereof, and expressly incorporated by reference herein.

FIELD OF INVENTION

The present invention relates generally to communication system and more specifically to techniques for using a sticky assignment.

BACKGROUND

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station (or access terminal) communicates with base station using a reverse link.

In order to make the communication between base stations and terminals more efficient, a concept of sticky assignments is used. Sticky assignments are useful in a scheduled data transmission system in cases where many users are competing for limited assignment message resources. A sticky assignment is when a resource (e.g. a channel) that is assigned to a particular user continues to be available to that user after the standard unit of transmission (say "packet") is completed. Thus, a new assignment message is not necessary to enable the AT to continue transmission.

Generally, when a transmitter of an access point or an access terminal completes transmitting a set of actual data and before transmitting another set of actual data packet, a break (also referred to as "a gap") in transmission occurs. The gap in data transmission refers to duration of time when no actual data is transmitted on the assigned resource (further discussed in FIG. 2). In a typical communication system, in the case of the access point transmitter, a possibility exists that the gap in transmission may be construed as, a loss of the assigned resource. In this case, the access terminal may request an assignment even though, the transmit resource is still allocated to the access terminal. In the case of the access point the gap may be interpreted as an indication that the access terminal no longer requires the assigned resource. In this case, the access point may assign the resource to another access terminal in the system. In both cases, it is inefficient and may lower the quality and reliability of the communication system.

Thus there is a need for a system and method to provide an indication of a gap in the transmission, so that the access point and access terminal do not interpret the gap in transmission as indication of not requiring the assigned resources or as an indication that the assigned resources were no longer available.

BRIEF SUMMARY

Accordingly, a method of managing an assignment of a resource assigned for transmitting data in communication system, the method transmitting a first data pattern on the assigned resource when there is no data to transmit on the assigned resource.

In another aspect, a method of managing an assignment of one or more resources assigned for data communication in communication system is provided, the method receiving one or more information bits on the assigned resource, and maintaining the assignment of said assigned resource, if determined that said one or more information bits represent an erasure signature packet.

A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Figure 1:
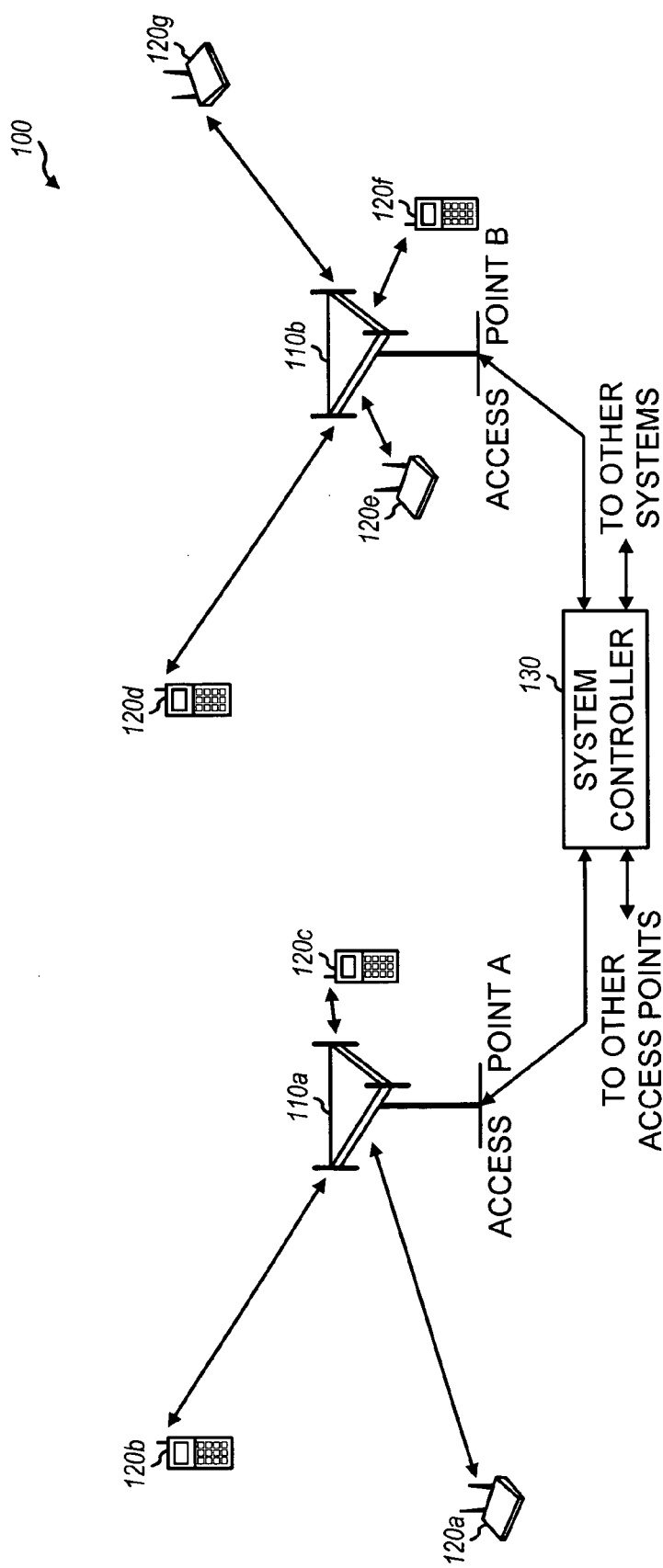
FIG. 1 shows a diagram of a wireless multiple-access communication system.

FIG. 1 shows a diagram of a wireless multiple-access communication system 100 that employs multi-carrier modulation. System 100 includes a number of access points (AP) 110 that communicate with one or more access terminal (AT) 120 (only two access points 110a and 110b are shown in FIG. 1 for simplicity). An AP 110x (110x is further discussed in FIG. 5, infra) is a fixed station that is used for communicating with the access terminals. An AP 110x may also be referred to as a base station or some other terminology.

Figure 5:
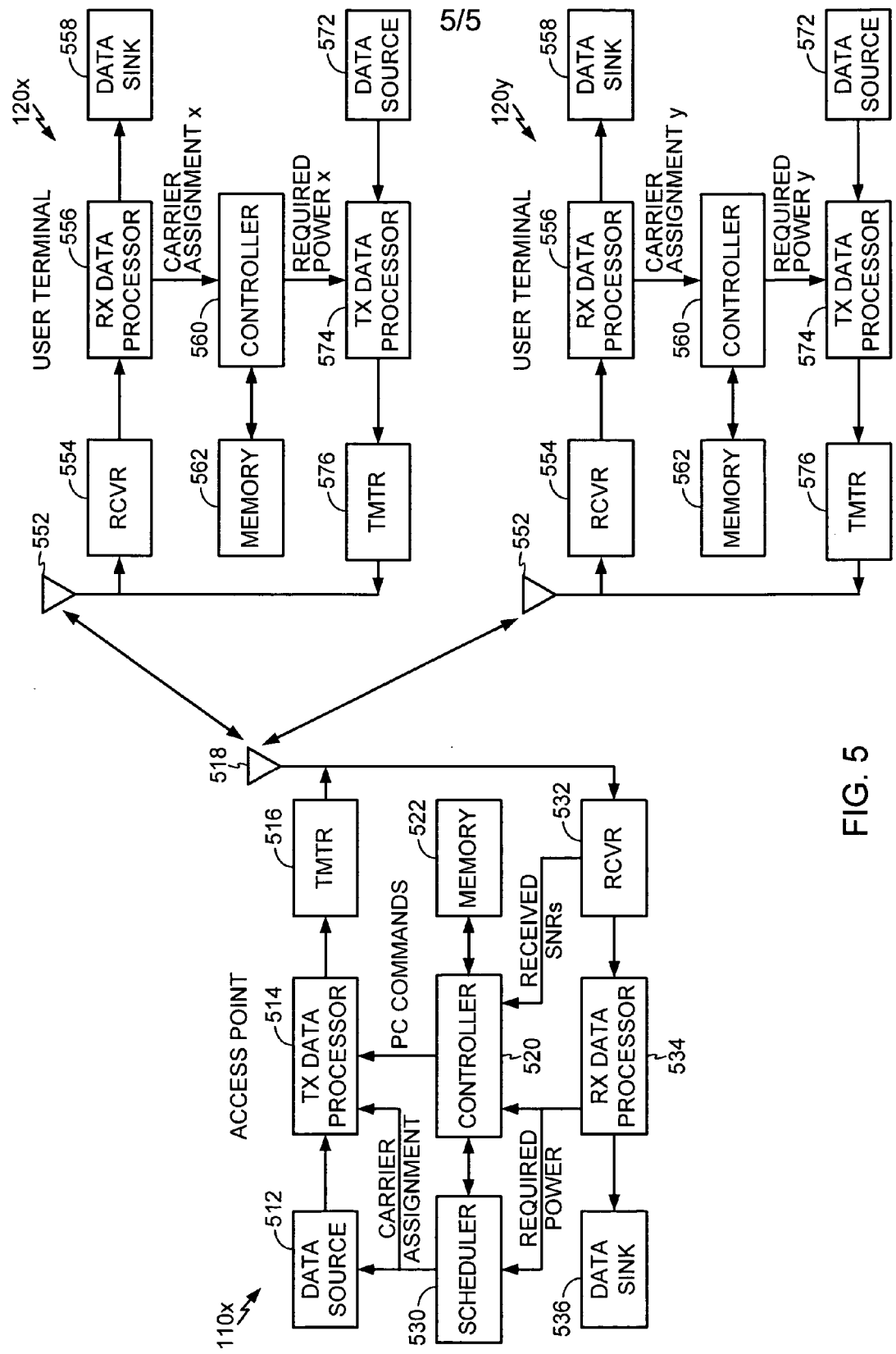
FIG. 5 shows a block diagram of an embodiment of an access point and two terminals.

An access point, for example AP 110x, is an electronic device configured to communicate with one or more access terminal, for example AT 120x (AT 120x is further discussed in FIG. 5, infra). The access point 110x may also be referred to as an access node, access network, a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system. The access point may be an electronic module comprising one or more computer chips controlled by a controller or a processor for transmitting, receiving and processing data according to air interface methods defined by an OFDMA, CDMA, GSM, WCDMA, etc.

An access terminal, for example AT 120x, is an electronic device configured to communicate with the AP 110x via a communication link. The AT 120x may also be referred to as an terminal, a user terminal, a remote station, a mobile station, a wireless communication device, recipient terminal, or some other terminology. The access terminal, mobile terminal, user terminal, terminal are interchangeably used in the description below. Each AT 120x may communicate with one or multiple access points on the downlink and/or uplink at any given moment. The downlink (i.e., forward link) refers to transmission from the AP 110x to the AT 120x, and the uplink (i.e., reverse link) refers to transmission from the AT 120x to the access point. The AT 120x may be any standard laptop, personal electronic organizer or assistant, a mobile phone, cellular phone, an electronic device configured to transmit, receive and process data according to air interface methods defined by an OFDMA, CDMA, GSM, WCDMA, etc. system. The AT 120x may be an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the terminals, and between the terminals and other users coupled to the other systems/networks.

The techniques described herein for providing an indication of a gap in transmission may be implemented in various wireless multiple-access multi-carrier communication systems. For example, system 100 may be an OFDMA, CDMA, GSM, WCDMA, etc. system that utilizes data transmission.

In an aspect, when a sticky assignment is used by the AP 110X to assign forward link (FL) and/or reverse link (RL) resources to the AT 120X, the AT 120X does not provide any acknowledgement that the AT 120x has received such assignment. Thus, the AP 110X may set up an FL assignment and start using the assigned resources to transmit data packets or erasure sequences without waiting for an acknowledgement. Where the AP 110X assigns a RL resources, the AP 110X will start processing received data from the AT 120x. In an aspect of the AT 120x, once the FL assignment is received, the AT 120x starts processing information received over the assigned resource, and if RL resource was provided, then transmit data to AP 110X using assigned RL resource.

In an aspect, the sticky assignments are allocated without a set duration (i.e. the assignment is valid until explicit or implicit termination). An explicit termination of an assignment occurs when either the AP 110X or AT 120x schedules a termination of assignment and terminates the assignment at the scheduled time. For example, when all the data packets have been transmitted (either by AP 110X on FL or AT 120x on RL), the AP 110X or AT 120x may expire the assigned transmit resource for the following frame. Also, the AP 110X or AT 120x may stop sending any packets or erasure sequences over the assigned resources. Generally, if neither a packet nor an erasure sequence is transmitted using the assigned resource, the assignment expires and the resources are free for subsequent allocation. When the AP 110X stops transmitting data packets of erasure sequences on FL resource, causing the AT 120x to attempt to process noise data, the AT 120x will declare that a packet error occurred and expire the resource. Similarly, when the AT 120x stops transmitting data packets of erasure sequences on RL resource, causing the AP 110X to attempt to process noise data, the AP 110X will declare that a packet error occurred and expire the resource. Thus, AP 110X or AT 120x may explicitly expire the resources without wasting resources causing a packet error.

An implicit termination of an assignment may occur in several ways. For example, the AP 110X may assign a currently assigned resources to another AT 120x instead. Thus, implicitly deassigning (terminating) the resources for one AT 120x and assigning the resources to another AT 120x. In another aspect, an implicit termination may occur if the AT 120x or AP 110X determines that a packet error occurred while processing data received on the assigned resources FL or RL, respectively. For the FL assigned resources, for example, the AT 120x will determine that a packet error occurred if the AT 120x does not receive a data packet or received data packet that does pass a CRC. The AT 120x may perform several attempts in order to determine if a packet was received before declaring a packet error. In another aspect, if AT 120x does not receive an expected erasure packet, the AT 120x may declare that packet error occurred and conclude that the assigned resources are no longer available. In an aspect, if determined that a packet error occurred, the AT 120x may notify (using an acknowledgement message) the AP 110X and wait for a new assignment. In the case of AN, for example, the AP 110X will determine that a packet error occurred if the AP 110X does not receive a data packet or received data packet that does pass a CRC. The AP 110X may perform several attempts in order to determine if a packet was received before declaring a packet error. In another aspect, if AP 110X does not receive an expected erasure packet, the AP 110X may declare that packet error occurred and conclude that the assigned resources are no longer available and may assign the resources to another AT 120x.

In an embodiment, "sticky" assignments are used. Sticky assignments allow the system controller 130, to reduce assignment requests. Sticky assignments allow the recipient of a given resource to use the assigned resource to perform multiple communications (transmission or reception) without requesting a new assignment for each communication.

For purpose of discussion, the AT 120x requests a reverse link transmit resource for transmitting data (actual data, content, etc.) to the AP 110x, that is servicing the AT 120x. Using an assignment message, the AP 110x provides the reverse link transmit resource assignment information, for example a channel identification, to the AT 120x that requested the assignment. Once, the assignment information is received, the AT 120x immediately transmits actual data on the assigned reverse link channel (resource). In a sticky assignment, the assigned channel continues to be assigned to the AT 120x. Thus, at various times during the period that a channel is assigned, no actual data is transmitted or received by the AT 120x or the AP 110x. Therefore, a first data pattern, referred to as an erasure signature packet, is used to fill in the gaps in transmission. The length, the construction and the data rate of the erasure signature packet may vary based on available resources. Available resources may be determined by the system controller 130 or the AP that is in communication with requesting AT. For example, if the receiving entity has the resources to process erasure signature packets having more information bits (for example, 3 bits), the length of erasure signature packet is adjusted to provide more information bit. This may allow the receiving entity to easily determine that the packet received was an erasure signature packet. Also, the power level at which the erasure signature packets are transmitted may vary in order to transmit the erasure sequence at a power level low enough that transmission of the erasure sequence does not cause significant interference.

Figure 2:
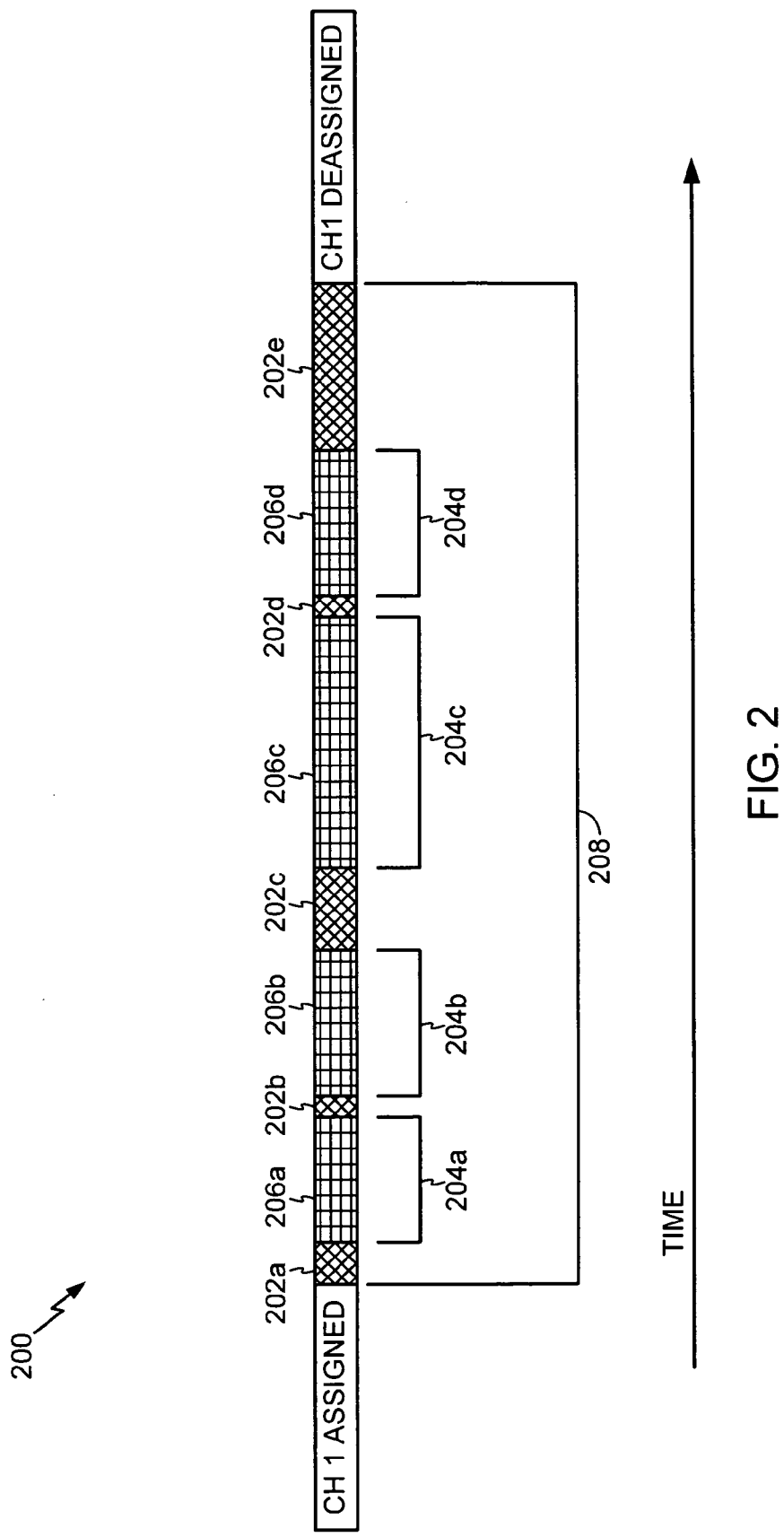
FIG. 2 shows an illustration of data traffic on an assigned channel during that uses a sticky assignment concept.

FIG. 2 shows an illustration 200 of data traffic on an assigned channel during using a sticky assignment concept. The sticky assignment duration 208 is generally between an assignment and a deassignment. During the sticky assignment duration 208, there may be several occurrence of transmission of data, for example 202a-202d, wherein transmit data packets are transmitted. Generally, data is not always transmitted continuously for the duration of sticky assignment 208, thus leaving gap portions, for example, 204a-204d. For purpose of discussion, whenever the TX data processor 574 of AT 120x, infra, is not sending data, the TX data processor 574 is configured to transmit an erasure signature packet, for example 206a-206d. The erasure signature packet may be one or more bits representing a unique pattern of data. In other words, the erasure signature packet fills the gap portions 204a-d with unique patterns and keeps the resources from getting terminated. The erasure signature packet may be a unique identifier that is known to both transmitter and the receiver prior to using the erasure signature packets. Also, in order to reduce interference, the erasure signature packet may be transmitted at low power and/or low data rate.

Figure 3:
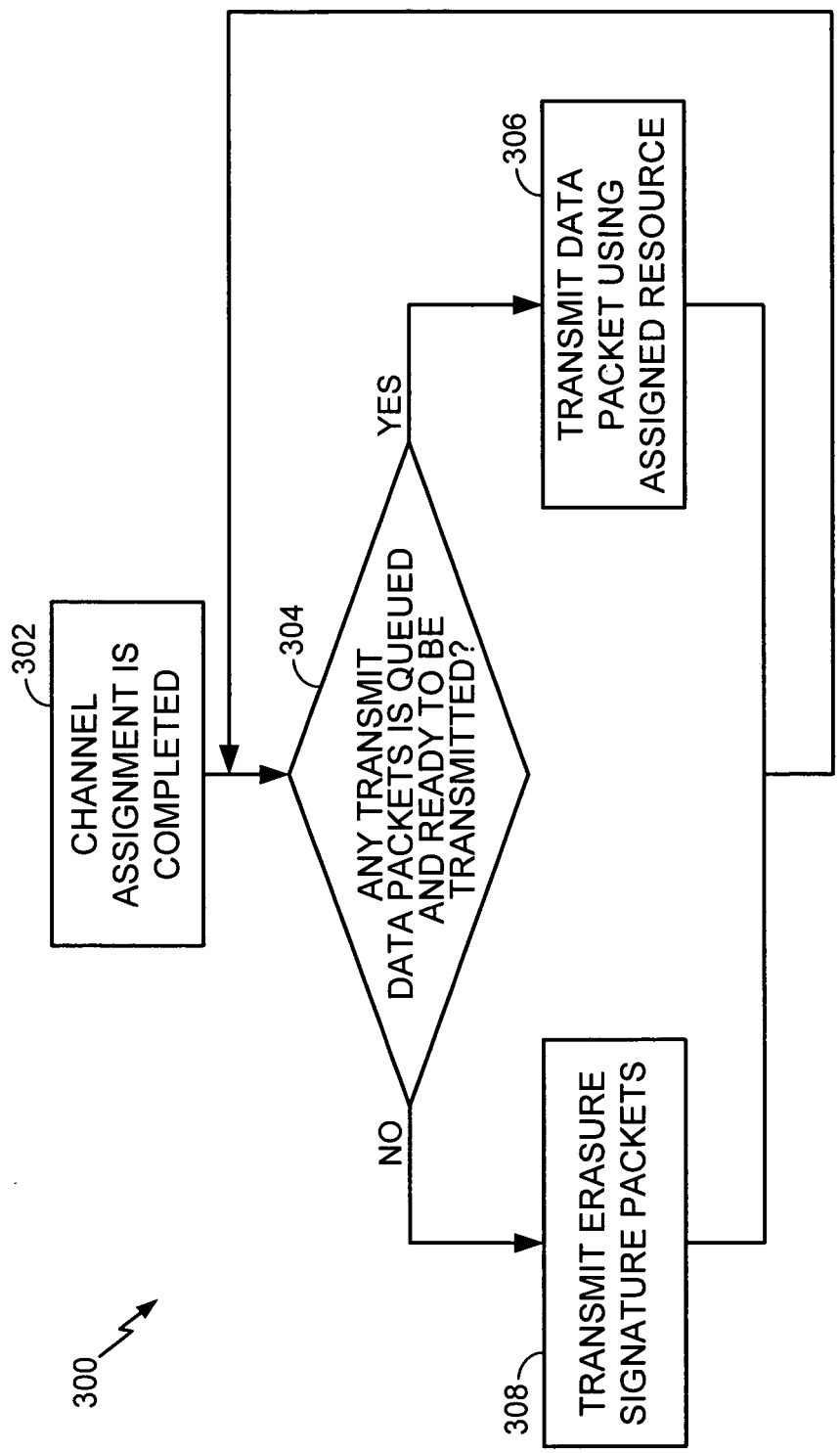
FIG. 3 shows process for data transmission by a access point during a sticky assignment of a resource on the forward link.

FIG. 3 shows a process 300 for data transmission by a processor (TX data processor 574 of AT or TX data processor 514 of AP) configured to transmit data during a sticky assignment of a transmit resource. For simplicity TX data processor 514 will be used to discuss the execution of the steps of process 300 for transmission of data on the forward link. The process 300 may also be implemented by the TX processor 574 for the transmission of data on the reverse link (e.g. transmitting data to AP). At step 302, the forward link data channel assignment is completed and the TX data processor 514 is ready to the send data, for example transmit data packet. At step 304, TX data processor 514 determines if any transmit data packets (for example, encoded data converted to data packets) are queued and ready to be transmitted. If determined that one or more data packets are ready to transmission, then at step 306, TX data processor 514 transmits the data packets using the assigned resource (ie, a forward link data channel for AP 110x and reverse link channel for terminal). Otherwise, at step 308, TX data processor 514 transmits a predetermined erasure signature packet using the assigned channel.

The erasure signature packet may be transmitted at a transmit power level that is lower than a predetermined threshold. The threshold may be predetermined and indicates a transmit power level such that transmitting above the threshold would cause interference. The erasure signature packets may also be transmitted at low data rate. Upon transmission of erasure packets or transmit data packets, the TX data processor 514 repeats the process and executes step 304 until the resources are deassigned or terminated.

Figure 4:
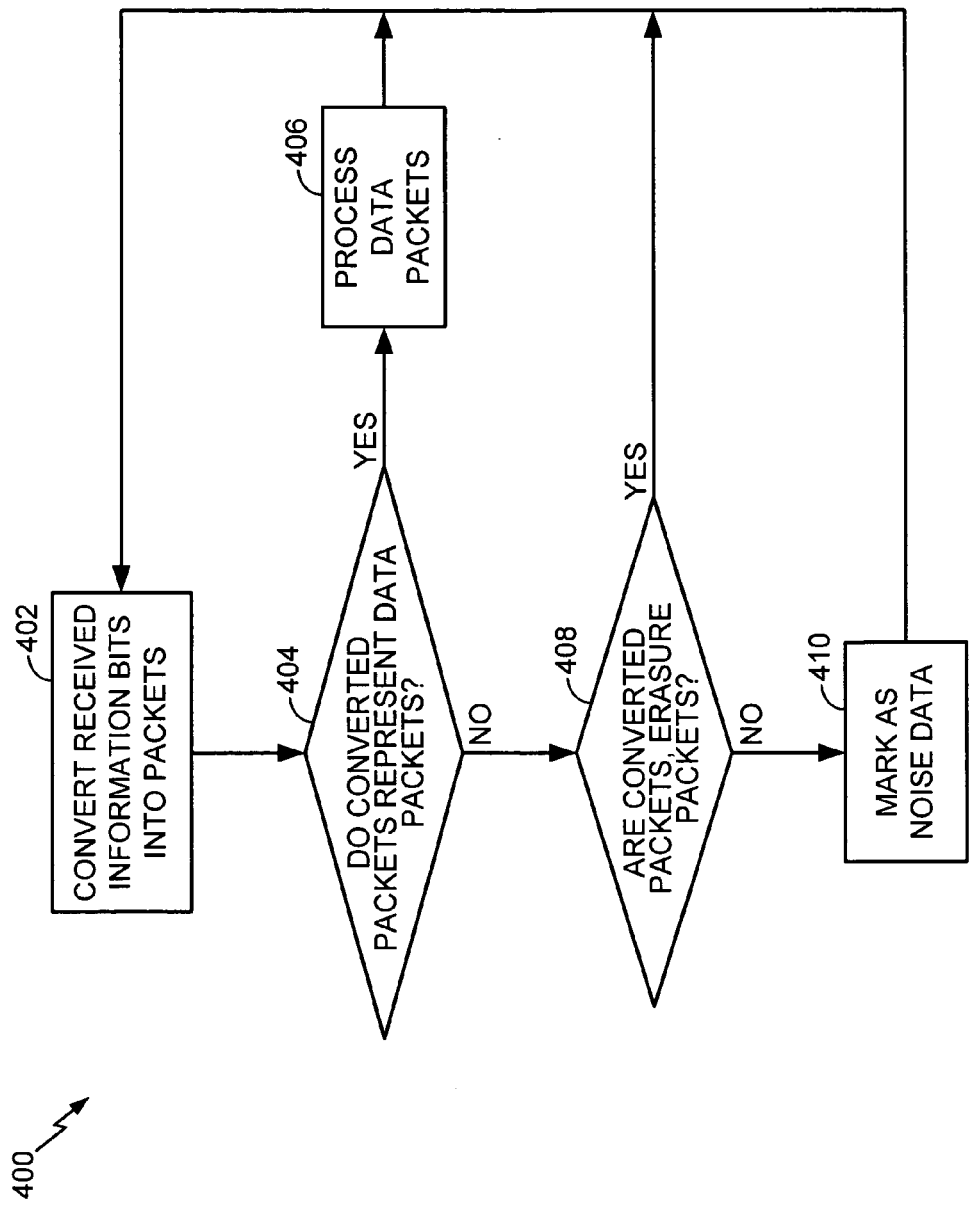
FIG. 4 shows process for data reception by a access point during a sticky assignment of a resource on the reverse link.

FIG. 4 shows a process 400 for processing data reception by a processor (RX data processor 556 of AT or RX data processor 534 of AP) configured to receive data during a sticky assignment of a resource. For simplicity RX data processor 534 will be used to discuss the execution of the steps of process 400 for reception of data on the reverse link. The process 400 may also be implemented by the RX processor 556 for the reception of data on the forward link (e.g. receiving data from AP). At step 402, one or more information bits are received over the assigned channel are evaluated as packets of data. At step 404, RX data processor 534 determines if the data packets represent actual data packets (encoded data transmitted by the transmitting entity). If so, then at step 406 RX data processor 534 process the data packets as normal. Otherwise, at step 408, RX data processor 534 determines if the data packets represent the erasure signature packets. If the data packets are erasure signature packets, then the packets are discarded and additional information bits are sampled at step 402. Otherwise, at step 410, RX data processor 534 flags the data packets as noise data and additional information bits are sampled at step 402. In an embodiment of AP 110x, the RX data processor 534 may continue to monitor the noise data and may determine that the resources are lost or may determine that the transmitting entity does not require the assigned resources after receiving noise data for a predetermine time.

FIG. 5 shows a block diagram of an embodiment of an AP 110x and two ATs 120x and 120y in multiple-access multi-carrier communication system 100. At AP 110x, a transmit (TX) data processor 514 receives traffic data (i.e., information bits) from a data source 512 and signaling and other information from a controller 520 and a scheduler 530. For example, controller 520 may provide power control (PC) commands that are used to adjust the transmit power of the active ATs, and scheduler 530 may provide assignments of carriers for the ATs. These various types of data may be sent on different transport channels. TX data processor 514 encodes and modulates the received data using multi-carrier modulation (e.g., OFDM) to provide modulated data (e.g., OFDM symbols). A transmitter unit (TMTR) 516 then processes the modulated data to generate a downlink modulated signal that is then transmitted from an antenna 518.

At each of ATs 120x and 120y, the transmitted and modulated signal is received by an antenna 552 and provided to a receiver unit (RCVR) 554. Receiver unit 554 processes and digitizes the received signal to provide samples. A received (RX) data processor 556 then demodulates and decodes the samples to provide decoded data, which may include recovered traffic data, messages, signaling, and so on. The traffic data may be provided to a data sink 558, and the carrier assignment and PC commands sent for the terminal are provided to a controller 560.

Controller 560 directs data transmission on the uplink using the specific carriers that have been assigned to the terminal and indicated in the received carrier assignment.

Controller 560 further injects the erasure signature packets when the there is not actual data to transmit, yet desires to keep the assigned resources.

For each active terminal 120, a TX data processor 574 receives traffic data from a data source 572 and signaling and other information from controller 560. For example, controller 560 may provide information indicative of the required transmit power, the maximum transmit power, or the difference between the maximum and required transmit powers for the terminal. The various types of data are coded and modulated by TX data processor 574 using the assigned carriers and further processed by a transmitter unit 576 to generate an uplink modulated signal that is then transmitted from antenna 552.

At AP 110*x*, the transmitted and modulated signals from the ATs are received by antenna 518, processed by a receiver unit 532, and demodulated and decoded by an RX data processor 534. Receiver unit 532 may estimate the received signal quality (e.g., the received signal-to-noise ratio (SNR)) for each terminal and provide this information to controller 520. Controller 520 may then derive the PC commands for each terminal such that the received signal quality for the terminal is maintained within an acceptable range. RX data processor 534 provides the recovered feedback information (e.g., the required transmit power) for each terminal to controller 520 and scheduler 530.

Scheduler 530 may provide an indication to controller 520 to maintain the resources. This indication is provided if more data is scheduled to be transmitted. For the AT 120*x*, the controller 560 may determine if resources required to be maintained.

The techniques described herein may be implemented by various means. For example, these techniques may be implemented in hardware, software, or a combination thereof. For a hardware implementation, the processing units (e.g., controllers 520 and 570, TX and RX processors 514 and 534, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 522 in FIG. 5) and executed by processors (e.g., controllers 520). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing an assignment of one or more resources in a scheduled data transmission system, the method comprising:
   selecting an erasure signature packet;
   transmitting a sticky assignment of an assigned channel resource for undetermined duration;
   transmitting a first data transmission on the assigned channel resource during the sticky assignment;
   transmitting a second data transmission on the assigned channel resource during the sticky assignment;
   actively determining presence of a gap between the first data transmission and the second data transmission; and
   filling the gap between the first data transmission and the second data transmission by continuously transmitting the erasure signature packet on the assigned channel resource when no other packet of data is available to transmit, the assigned channel resource staying available during transmission of the first data transmission, the second data transmission and/or transmission of the erasure signature packet;
   wherein the at least one erasure signature packet comprises one or more information bits that cause assignment of the assigned channel resource to be maintained.

2. The method as claimed in claim 1, further comprising re-assigning said assigned channel resource if it is determined that a packet error occurred while processing data transmitted on said assigned channel resource.

3. The method as claimed in claim 1, further comprising expiring said assigned channel resource by not transmitting any data packet or the erasure signature packet.

4. A method of managing assignment of resources in a communication system, the method comprising:
   receiving a first data transmission on an assigned channel resource during a sticky assignment of the assigned channel resource;
   receiving a second data transmission on the assigned channel resource during the sticky assignment of the assigned channel resource;
   receiving at least one erasure signature packet on the assigned resource, the at least one erasure signature packet filling a gap between the first data transmission and the second data transmission;
   determining presence of the gap between the first data transmission and the second data transmission in response to receiving the at least one erasure signature packet; and
   maintaining assignment of the assigned channel resource upon receiving the at least one erasure signature packet
   wherein the at least one erasure signature packet comprises one or more information bits that cause assignment of the assigned channel resource to be maintained.

5. An apparatus configured to manage an assignment of one or more resources in a scheduled data transmission system, the apparatus comprising:
   selecting an erasure signature packet;
   means for transmitting a sticky assignment of an assigned channel resource for undetermined duration;
   means for transmitting a first data transmission on the assigned channel resource during the sticky assignment;
   means for transmitting a second data transmission on the assigned channel resource during the sticky assignment;
   means for actively determining presence of a gap between the first data transmission and the second data transmission; and means for filling the gap between the first data transmission and the second data transmission by continuously transmitting the erasure signature packet on the assigned channel resource when no other packet of data is available to transmit, the assigned channel resource staying available during transmission of the first data transmission, the second data transmission and/or transmission of the erasure signature packet;

wherein the at least one erasure signature packet comprises one or more information bits that cause assignment of the assigned channel resource to be maintained.

6. The apparatus as claimed in claim 5, further comprising means for re-assigning said assigned channel resource if determined that a packet error occurred while processing data transmitted on said assigned channel resource.

7. The apparatus as claimed in claim 5, further comprising means for expiring said assigned channel resource by not transmitting any data packet or the erasure signature packet.

8. An apparatus configured to manage assignment of resources in a communication system, the apparatus comprising:

means for receiving a first data transmission on an assigned channel resource during a sticky assignment of the assigned channel resource;

means for receiving a second data transmission on the assigned channel resource during the sticky assignment of the assigned channel resource;

means for receiving at least one erasure signature packet on the assigned resource, the at least one erasure signature packet filling a gap between the first data transmission and the second data transmission;

means for determining presence of the gap between the first data transmission and the second data transmission in response to receiving the at least one erasure signature packet; and means for maintaining assignment of the assigned channel resource upon receiving the at least one erasure signature packet wherein the at least one erasure signature packet comprises one or more information bits that cause assignment of the assigned channel resource to be maintained.

9. In a scheduled data transmission system, an apparatus comprising:

an electronic device configured to manage assignment of one or more resources, configured to select an erasure signature packet, configured to transmit a sticky assignment of an assigned channel resource for undetermined duration;

configured to transmit a first data transmission on the assigned channel resource during the sticky assignment;

configured to transmit a second data assignment on the assigned channel resource during the sticky assignment;

configured to actively determine the presence of a gap between the first data transmission and the second data transmission; and configured to fill the gap between the first data transmission and the second data transmission by continuously transmitting the erasure signature packet on the assigned channel resource when no other packet of data is available to transmit, the assigned channel resource staying available during transmission of the first data transmission, the second data transmission and/or transmission of the erasure signature packet;

wherein the at least one erasure signature packet comprises one or more information bits that cause assignment of the assigned channel resource to be maintained.

10. The apparatus as claimed in claim 9, wherein said electronic device is further configured to re-assign said assigned channel resource if it is determined that a packet error occurred while processing data transmitted on said assigned channel resource.

11. The apparatus as claimed in claim 9, wherein said electronic device is further configured to expire said assigned channel resource by not transmitting any data packet or the erasure signature packet.

12. In a scheduled data transmission system, an apparatus comprising:

an electronic device configured to manage assignment of one or more resources;

configured to receive a first data transmission on an assigned channel resource during a sticky assignment of the assigned channel resource;

configured to receive a second data transmission on the assigned channel resource during the sticky assignment of the assigned channel resource;

configured to receive at least one erasure signature packet on the assigned resource, the at least one erasure signature packet filling a gap between the first data transmission and the second data transmission;

configured to determine presence of the gap between the first data transmission and the second data transmission in response to receiving the at least one erasure signature packet; and configured to maintain assignment of the assigned channel resource upon receiving the at least one erasure signature packet;

wherein the at least one erasure signature packet comprises one or more information bits that cause assignment of the assigned channel resource to be maintained.

13. A non-transitory machine-readable medium comprising instructions which, when executed by a processor, cause the processor to perform operations including:

selecting an erasure signature packet;

transmitting a sticky assignment of an assigned channel resource for undetermined duration;

transmitting a first data transmission on the assigned channel resource during the sticky assignment;

transmitting a second data transmission on the assigned channel resource during the sticky assignment;

actively determining presence of a gap between the first data transmission and the second data transmission; and filling the gap between the first data transmission and the second data transmission by continuously transmitting the erasure signature packet on the assigned channel resource when no other packet of data is available to transmit, the assigned channel resource staying available during transmission of the first data transmission, the second data transmission and/or transmission of the erasure signature packet;

wherein the at least one erasure signature packet comprises one or more information bits that cause assignment of the assigned channel resource to be maintained.

14. A non-transitory machine-readable medium comprising instructions which, when executed by a processor, cause the processor to perform operations including:

receiving a first data transmission on an assigned channel resource during a sticky assignment of the assigned channel resource;

receiving a second data transmission on the assigned channel resource during the sticky assignment of the assigned channel resource;

receiving at least one erasure signature packet on the assigned resource, the at least one erasure signature packet filling a gap between the first data transmission and the second data transmission;

determining presence of the gap between the first data transmission and the second data transmission in response to receiving the at least one erasure signature packet; and maintaining assignment of the assigned channel resource upon receiving the at least one erasure signature packets;

wherein the at least one erasure signature packet comprises one or more information bits that cause assignment of the assigned channel resource to be maintained.

* * * * *